United States Patent
Petereit et al.

(10) Patent No.: US 7,671,740 B2
(45) Date of Patent: *Mar. 2, 2010

(54) CAPACITIVE TRANSMITTER ELECTRODE

(75) Inventors: Andreas Petereit, Schweich (DE); Thomas Schleeh, Trier (DE); Christoph Wendt, Trier (DE); Emmanuel Huegens, Arlon (DE); Harald Clos, Saarbrücken (DE)

(73) Assignee: IEE International Electronics & Engineering S.A. (LU)

( * ) Notice: Subject to any disclaimer, the term of this patent is extended or adjusted under 35 U.S.C. 154(b) by 451 days.

This patent is subject to a terminal disclaimer.

(21) Appl. No.: 11/632,034

(22) PCT Filed: Jul. 8, 2005

(86) PCT No.: PCT/EP2005/053281

§ 371 (c)(1),
(2), (4) Date: Jan. 8, 2007

(87) PCT Pub. No.: WO2006/008247

PCT Pub. Date: Jan. 26, 2006

(65) Prior Publication Data

US 2008/0036474 A1  Feb. 14, 2008

(30) Foreign Application Priority Data

Jul. 22, 2004 (EP) .................................. 04103523

(51) Int. Cl.
*G08B 13/26* (2006.01)

(52) U.S. Cl. ........................................ 340/562
(58) Field of Classification Search ................. 340/562, 340/540; 324/519, 691
See application file for complete search history.

(56) References Cited

U.S. PATENT DOCUMENTS

| 5,192,932 A * | 3/1993 | Schwab, Jr. .................. 340/604 |
| 5,446,391 A * | 8/1995 | Aoki et al. .................. 324/661 |
| 6,011,477 A | 1/2000 | Teodorescu et al. |
| 2002/0003345 A1 * | 1/2002 | Stanley et al. ............... 280/735 |

OTHER PUBLICATIONS

International Search Report; PCT/EP2005/053281; Oct. 5, 2005.

* cited by examiner

*Primary Examiner*—Phung Nguyen
(74) *Attorney, Agent, or Firm*—Cantor Colburn LLP

(57) ABSTRACT

A transmitter electrode (10) for a capacitive sensing device comprises a conductive sheet material (12), said conductive sheet material comprising a first connecting point (16) for connecting the electrode to an electronic sensing unit. According to the invention the conductive sheet material comprises at least one second connecting point for connecting the electrode to an electronic sensing unit, said second connecting point (16') being arranged at a certain distance from said first connecting point so that said conductive sheet material forms a conductive path between said first and second connecting point. The first and second connecting point (16, 16'), which in use are both connected to the electronic sensing unit, enable to check the integrity of the transmitter electrode and the connection lines used to connect the transmitter electrode to the electronic sensing unit.

7 Claims, 3 Drawing Sheets

CAPACITIVE TRANSMITTER ELECTRODE

TECHNICAL FIELD OF THE INVENTION

The present invention generally relates to a transmitter electrode for a capacitive sensing device e.g. of a safety device in an automotive vehicle.

BRIEF DESCRIPTION OF RELATED ART

In order to protect the lives of passengers during a traffic accident, modern vehicles are generally provided with a protection system comprising several airbags and seat belt pretensioners, which are used to absorb the energy of a passenger released during the collision due to the accident. It is clear that such protection systems are most effective when they are well adapted to the specific requirements of an actual seat occupancy. That is why microprocessor-controlled protection systems have been designed which provide several operational modes, allowing for example an adaptation of the instant at which airbags are deployed, the volume to which the airbags are inflated, the instant at which safety belts are released after the collision, etc, as a function of the stature of a passenger on the seat. In order to enable the control microprocessor to select the optimum operational mode for a given seat occupancy status, it is of course necessary to detect one or several parameters characterizing the occupancy status of the seat and to classify the occupancy into one of several classes, each of which is associated to a specific operational mode of the restraint system.

One approach for gathering relevant parameters of a seat occupancy is based on the detection of the capacitive coupling of a body to one or several electrodes arranged in the seat. Such a measurement system is for instance described in LU-A-88 828. This measurement system comprises at least one transmitting electrode and at least one receiving electrode that are capacitively coupled by a conductive body. The receiving electrodes are connected to an analysis circuit that determines the capacitive coupling of the transmitting antenna with the conductive body by comparing the measured signal with a reference signal.

Various other systems have been disclosed with electrodes arranged at different locations in the passenger compartment in order to detect the presence and/or the nature of a seat occupancy and to classify the occupancy status in one of several classes. German patent application DE-A-102 35 881 discloses e.g. a combined occupant detection system comprising a first transmitter electrode arranged in a seating surface of a vehicle seat and a second transmitter electrode arranged in the foot compartment of the vehicle. The combined detection system can further comprise a pressure sensitive mat to be arranged together with the second electrode into the foot compartment.

The transmitter electrodes of the above described capacitive sensing devices usually comprises a simple conductive sheet material including one connecting point for connecting the electrode to an electronic sensing unit. In use, the transmitter electrode is supplied with an AC voltage by the electronic sensing unit and the current flowing through the transmitter electrode is monitored in order to determine a capacitive coupling to an object within the sensing range.

The problem with this kind of transmitter electrodes is that the actual layout of the electrodes does not allow to detect a failure of the connection between the transmitter electrode and the electronic sensing unit. Such failure may however lead to an erroneous detection of an object within the sensing area and result in an inadequate deployment mode of the secondary restraint system. In fact, if the connection line between the electronic sensing unit and the transmitter electrode breaks and establishes a short-circuit to any part of the vehicle compartment, the electronic sensing unit will detect a large loading current in detection mode.

BRIEF SUMMARY OF THE INVENTION

An automotive safety system is provided with a transmitter electrode that comprises a conductive sheet material, said conductive sheet material having an outline defining the sensing area of said transmitter electrode. According to the present invention, said conductive sheet material comprises at least one cut-out, said cut-out being arranged within said sensing area of said transmitter electrode. The cut-out arranged within the sensing area of the electrode reduces the electrode surface and accordingly also reduces the capacitance of the capacitor formed together with the vehicle floor, in fact, the capacitor formed by the transmitter electrode and the vehicle floor can be considered as a plate capacitor so that the capacitance of the formed capacitor is substantially proportional to the area of the transmitter electrode. By providing at least one cut-out within the sensing area, the effective area of the transmitter electrode and consequently the resulting capacitance is reduced.

In order to maximize the monitored area of the transmitter electrode, it is desirable that the monitorable conductive path extends as far as possible through the sensing area of the transmitter electrode. Accordingly the at least one second connecting point is preferably arranged on said conductive sheet material at a location, which is diametrically opposed to the first connecting point from an electrical point of view. In a very simple variant of this embodiment, the conductive sheet material may comprise a simple closed shape and the first and second connecting points are physically or geometrically located at two diametrically opposed points of the sheet material. However due to the distance between the first and second connecting point, such an embodiment is difficult to connect to the electronic sensing unit.

In a more preferred embodiment, the first and second connecting points are therefore preferably located close together, so that connection at a single connector area is possible. In this case, the shape of the sheet material should be suitably configured in such a way, that the first and second connecting point are well separated from an electrical point of view. This may be achieved if the conductive path between the first and second connecting points extends as far as possible into the sheet material so that the physically close connecting points are separated by a long electrical conductive path.

In a possible embodiment of the transmitter electrode, the conductive sheet material comprises at least one incision, said at least one incision extending between said first and second connecting point from a border of said sheet material towards the interior of said sheet material. The incision may be used to shape said conductive path between said first and second connecting point so as to increase the length of said conductive path. By suitably configuring the incision, it is thus possible to maximize the length of the conductive path, thus maximising the monitorable area of the transmitter electrode.

It will be noted that the incision in this context denotes any gap in the conductive sheet material, which is suitable to prevent a current to flow across the incision. Accordingly the incision may have any possible shape, which is suitable for preventing the current to pass across. In practice, the incision will usually have a generally elongate shape having a small width. Thus the overall surface of the incision will be small with respect to the overall surface of the transmitter electrode so that the sensitivity of the transmitter electrode is not substantially reduced. In fact, the objects to be detected by the sensing devices are located at a certain distance from the transmitter electrode. At a certain distance from the transmitter electrode, the electrical field of the transmitter electrode is however mainly determined by the overall size of the electrode. This electrical field is not substantially altered by the provision of incisions in the conductive material, as long as the size of the incisions does not exceed a certain value.

In an advantageous embodiment of the invention, the conductive sheet material comprises a plurality of incisions, each said incision extending from a border of said sheet material towards the interior of said sheet material, said incisions being arranged in such a way that said conductive path between said first and second connecting point comprises a meandering shape. Due to the meandering shape, the conductive path may be configured to extend to every region of the conductive sheet material, thus enabling an optimization of the monitorable area of the transmitter electrode. It will be noted that in this embodiment the conductive sheet material takes the form of a meandering conductive path.

In a most preferred embodiment of the invention, the transmitter electrode comprises at least one diode means, said diode means being arranged at the second connecting point so as to be connectable in series between the electronic sensing unit and said second connecting point. The diode advantageously enables a check of the entire system consisting of the transmitter electrode and the connection lines used to connect the transmitter electrode to the electronic sensing unit. In fact, if the first connecting point of the transmitter electrode is supplied with a DC voltage in conducting direction of the diode, the resistance of the entire transmitter electrode including the connecting lines may be determined and the integrity of the transmitter electrode may be checked. If however the first connecting point of the transmitter electrode is supplied with a DC voltage in non-conducting direction of the diode, no current should flow and the isolation of the transmitter electrode including the first connection line (connecting the first connecting point) with respect to the vehicle compartment can be checked. Accordingly this embodiment enables to check the entire electrical status of the transmitter electrode, thus eliminating the risk of wrong classification of the actual seat occupancy due to electrode failure.

In a possible embodiment of the invention, the conductive sheet material comprises at least one cut-out, said cut-out being arranged within a sensing area of said transmitter electrode. The cut-out may be arranged in the conductive sheet material in such a way that said at least one cut-out overlaps with at least one incision of said conductive sheet material. In this case the cut-out may be part of the incision.

The cut-out arranged within the sensing area of the electrode reduces the effective electrode surface, thus reducing the capacitance of the capacitor formed by the electrode together with the vehicle floor. The lower electrode surface thus requires less driver capacity from the electronic sensing unit, which in turn allows the development of electronics with reduced weight and smaller dimensions, which may be easier integrated into the usually limited integration space e.g. in a vehicle seat. Furthermore due to the reduced capacity of the electronics, the electronic sensing unit can be manufactured at reduced costs. Finally the lower electrode surface leads to a reduced consumption of conductive material in the manufacturing process of the electrode which means that the transmitter electrode itself is also less expensive.

It will be appreciated, that the transmitter electrode may be formed from any suitable conductive sheet material such as e.g. a metal foil like a cupper sheet or an electroconductive textile material (such as a metallized (Aluminium) textile material or textile made from conductive fibres). In a preferred embodiment, the conductive sheet material may simply comprise an electroconductive coating, which is applied to a surface of a flexible carrier layer. In this embodiment, the incisions of the transmitter electrode are preferably formed by non-coated areas of the carrier layer. This embodiment allows an economical manufacture of the transmitter electrodes. In order to reduce the weight of the transmitter electrode, incisions may also be stamped out of the carrier layer in the non-coated regions of thereof. These openings are preferably slightly smaller than the incisions in the conductive sheet material. Alternatively, the incisions may be stamped out of the coated carrier layer.

The electroconductive coating, i.e. the conductive sheet material, may also be applied onto the carder layer in a screen-printing process. Such a screen-printing process enables the printing of electroconductive inks (e.g. graphite or metals such as silver or metal oxides) with a high resolution in every possible complex pattern. It follows that any possible distribution of the plurality of incisions and any possible shape of the individual incisions is easily obtained by such a printing process.

BRIEF DESCRIPTION OF THE DRAWINGS

Preferred embodiments of the invention will now be described, by way of example, with reference to the accompanying drawings in which.

DETAILED DESCRIPTION OF INVENTION

Figure 1:
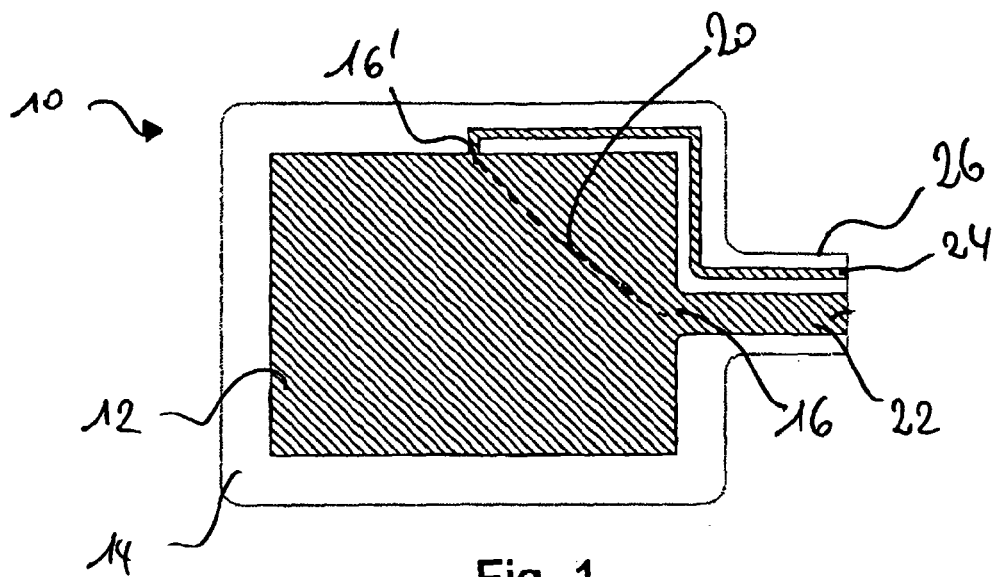
FIG. 1 is a plan view of an embodiment of a transmitter electrode.

FIG. 1 shows a first embodiment of a transmitter electrode 10 for a capacitive sensing system. The transmitter electrode 10 comprises a conductive sheet material 12, which may be applied to a carrier foil 14 made of a suitable dielectric material, such as a PET foil. Transmitter electrode 10 further comprises a first connecting point 16, for connecting the transmitter electrode 10 to an electronic sensing unit (not shown). The conductive sheet material may e.g. comprise a metal foil or conductive coating applied to the carrier foil. The conductive coating may comprise a metal or another suitable conductive material such as graphite or the like.

In accordance with an embodiment of the present invention, the shown electrode 10 comprises a second connection point 16', which is arranged at a certain distance from said first connecting point 16 so that said conductive sheet material 12 forms a conductive path between said first and second connecting points 16 and 16'. In FIG. 1, the so formed conductive path is schematically represented by a dashed line 20. If each of the connecting points 16 and 16' of the transmitter electrode 10 is individually connected to the electronic sensing unit, integrity of the transmitter electrode may be checked by monitoring the electrical resistance between the two connecting points 16 and 16'.

In order to connect the connecting points 16 and 16' to the electronic sensing unit, both connecting points may be connected via conductive traces 22 and 24 with a connection lug 26. Connection to the electronic sensing unit may then be achieved by connection lines, which are crimped on the connection lug 26 onto the ends of conductive traces 22 and 24.

Figure 2:
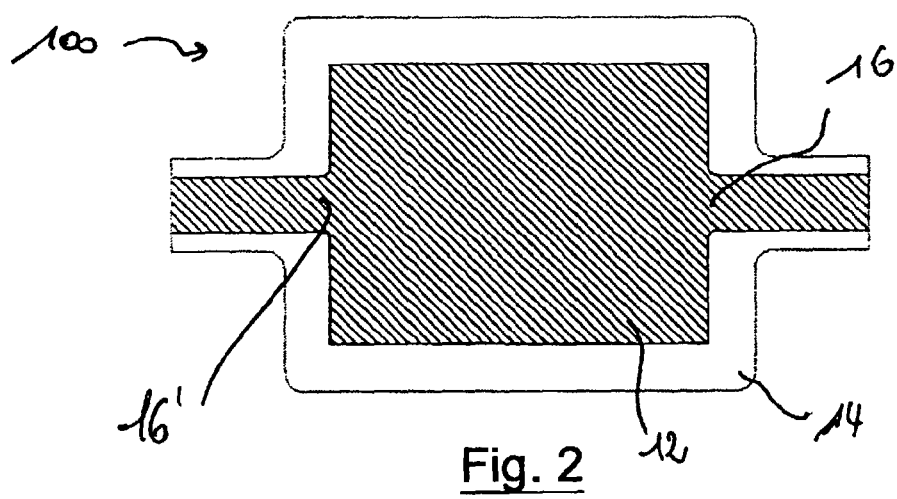
FIG. 2 is a plan view of an embodiment of a transmitter electrode, with physically opposite connecting points.
Figure 3:
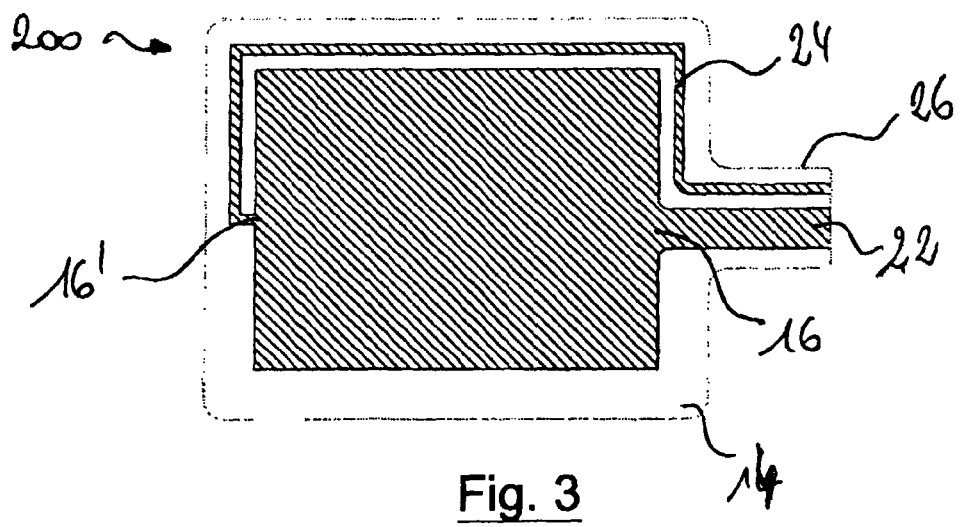
FIG. 3 is a plan view of an embodiment of a transmitter electrode, with opposite connecting points from an electrical point of view.

As it is preferable that the conductive path 20 extends as far as possible through the sensing area of the transmitter electrode, the second connecting point 16' is preferably arranged on said conductive sheet material 12 at a location, which is diametrically opposed to the first connecting point 16 from an electrical point of view. A very simple variant of this embodiment is shown in FIG. 2. The first and second connecting points 16 and 16' are physically located at two diametrically opposed points of the sheet material 12. However due to the distance between the first and second connecting point, such an embodiment is difficult to connect to the electronic sensing unit. A different embodiment, in which connecting points 16 and 16' are connected to a common connection lug 26 by means of conductive traces 22 and 24, is shown at 200 in FIG. 3.

Figure 4:
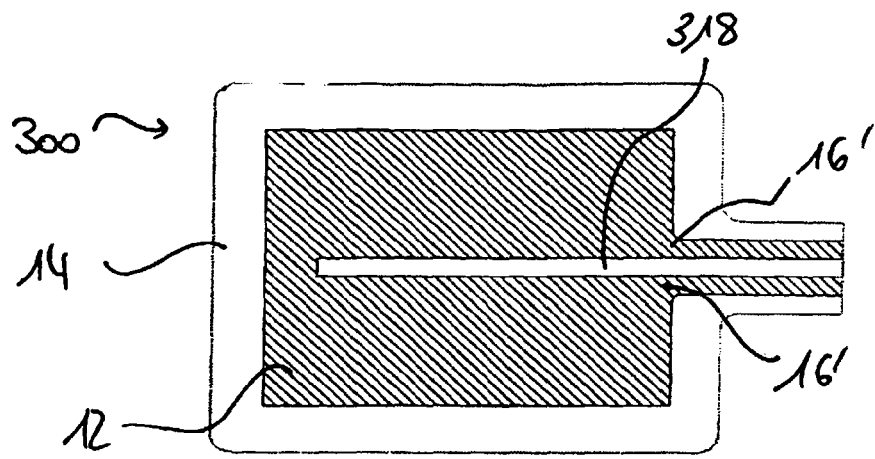
FIG. 4 is a plan view of an embodiment of a transmitter electrode with incision.

FIG. 4 shows a plan view of an embodiment of a transmitter electrode 300, in which the two connecting points 16 and 16' are physically arranged in immediate vicinity from each other. In this embodiment, the conductive sheet material 12 is suitably shaped in order to separate the two connection points 16 and 16' electrically. The "electrical" separation of the two connecting points is achieved by an incision or gap 318, extending between said first and second connecting points 16 and 16' from a border of said sheet material 12 towards the interior of said sheet material. The incision or gap 318 prevents a current to directly flow across the incision from one connecting point to the other. The conductive path connecting the two connecting points 16 and 16' accordingly passes around the incision and thus extends through the entire sensing area.

Figure 5:
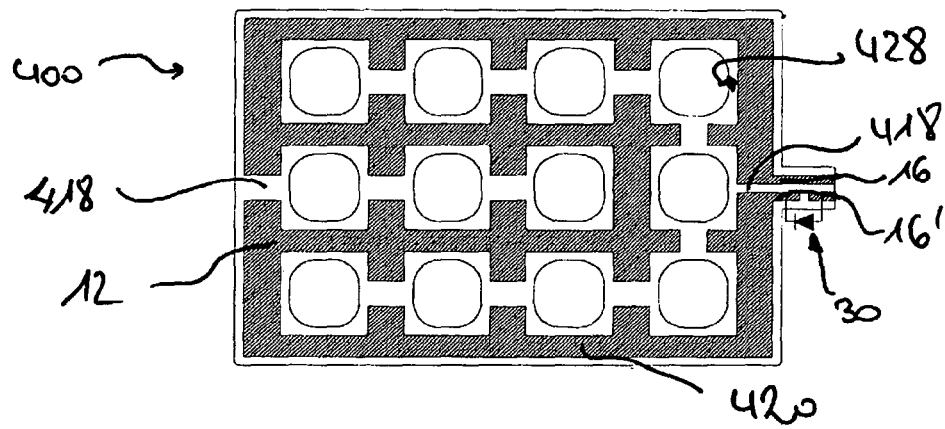
FIG. 5-FIG. 8 are plan views of different embodiments with cut-outs.
Figure 6:
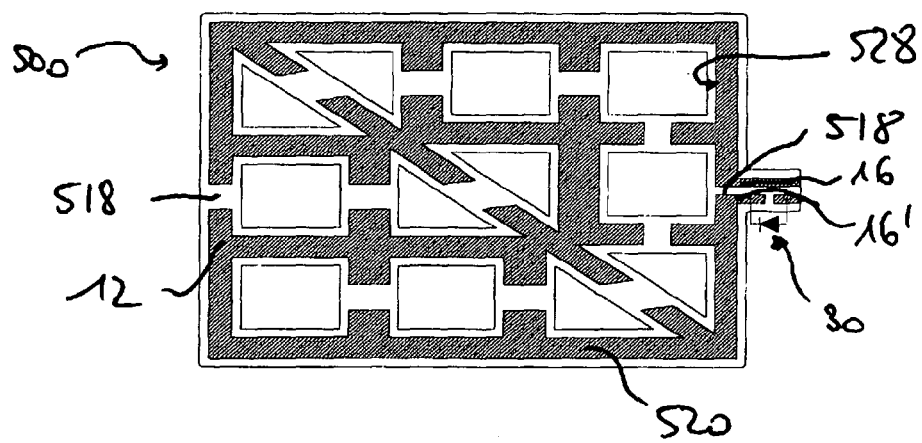

FIGS. 5 and 6 represent embodiments of the transmitter electrodes 400 and 500, wherein the conductive sheet material 12 comprises several cut-outs 428 and 528 of different shapes and several incisions 418 and 518. The cut-outs 428 or 528 arranged within the sensing area of the electrodes reduce the effective electrode surface, thus reducing the capacitance of the capacitor formed by the electrode together with e.g. a vehicle floor. The lower electrode surface thus requires less driver capacity from the electronic sensing unit, which in turn allows the development of smaller electronics.

In FIG. 5, the different cut-outs are of similar shape and arranged in the sensing area in a regular distribution. The sensing area of the electrode is e.g. defined by the outer border of the conductive sheet material 12. In FIG. 6, the cutouts 528 have different shapes and sizes.

In both embodiments, some of the cut-outs 428 or 528 are interconnected by an incisions or gaps 418 or 518 so that a conductive path 420 or 520, which is formed by the conductive sheet material 12 and which connects the connecting points 16 and 16', comprises a meandering shape. Due to the meandering shape, the conductive path may be configured to extend to every region of the conductive sheet material, thus enabling an optimization of the monitorable area of the transmitter electrode.

Figure 7:
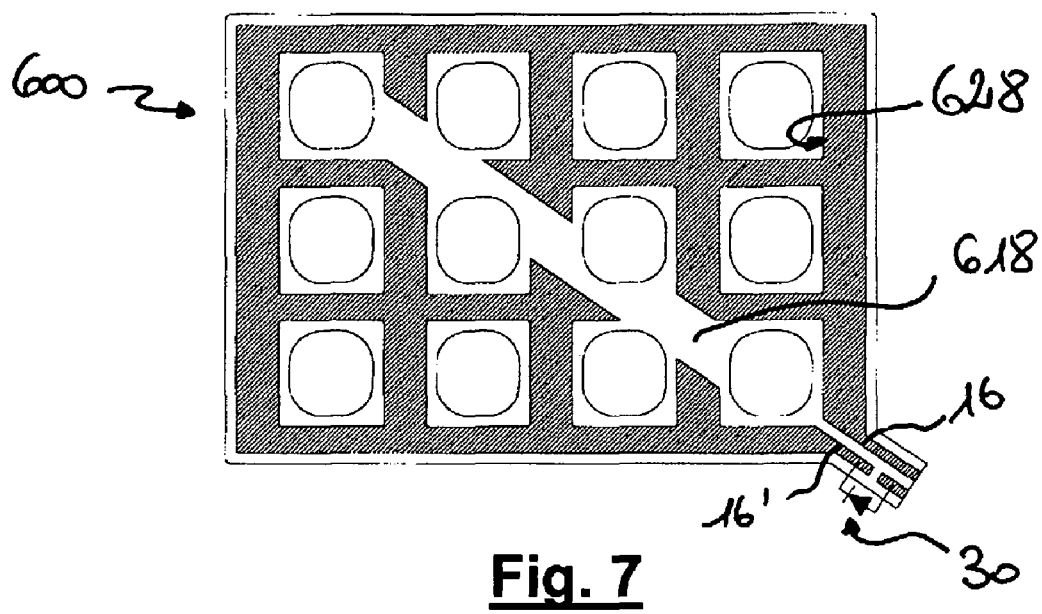

FIG. 7 shows an embodiment of a transmitter electrode 600, in which the conductive path 22 between the connecting points 16 and 16' is shaped similar to the embodiment of FIG. 4 by a single elongate incision 618. The connecting points 16 and 16' of transmitter electrode 600 are arranged in a corner of the sensing area and incision 618 extends from a corner of the conductive sheet material diagonally within the sensing area. The conductive sheet material of transmitter electrode further comprises several cut-outs 628 for reducing the effective area of the electrode. The cut-outs 628 are arranged in a regular distribution, with some of the cut-outs overlapping the incision 618. The overlapping cut-outs are thus a part of the incision 618.

It will be noted, that the transmitter electrode 400, 500 and 600 of FIGS. 5-7 each comprise a diode 30, which is arranged at the second connecting point 16' so as to be connectable in series between the electronic sensing unit and said second connecting point 16'. As described above, the diode advantageously enables a check of the entire system consisting of the transmitter electrode and the connection lines used to connect the transmitter electrode to the electronic sensing unit.

Figure 8:
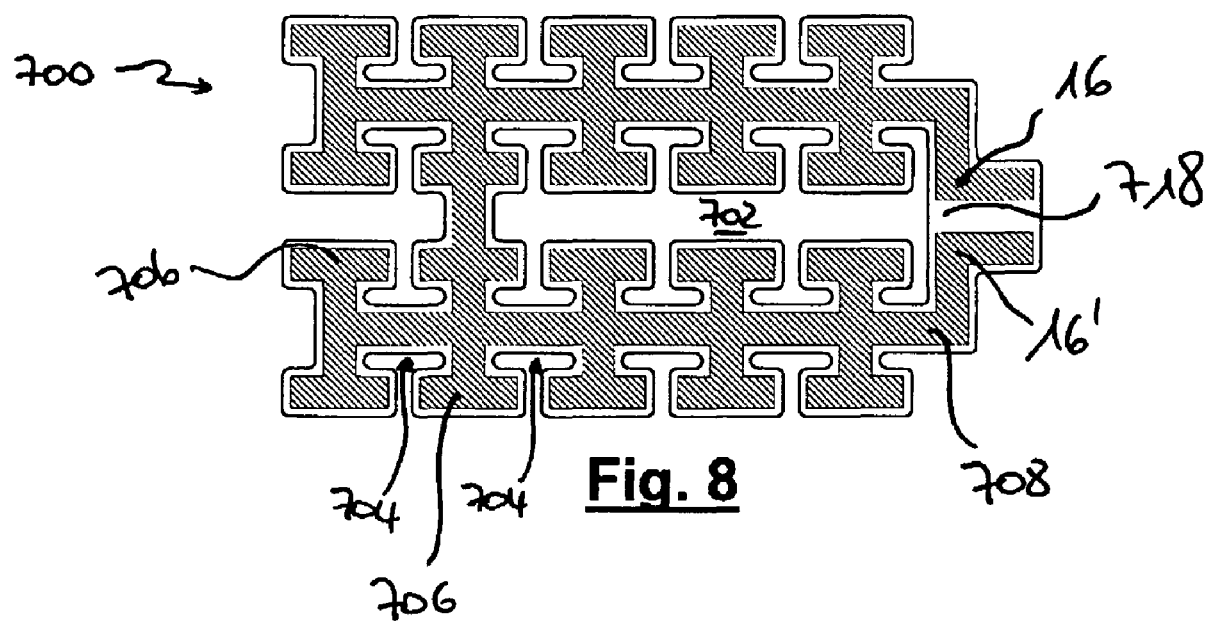

A further embodiment of a transmitter electrode 700 is shown in FIG. 8. Transmitter electrode 700 comprises a central cut-out 702 and a number of peripheral cut-outs 704, extending inwardly from the outline of the electrode. The different cut-outs are configured such that the transmitter electrode comprises a number of T-shaped projections 706 extending on either side from a conductive path 708. The configuration is such that the conductive path 708 itself extends between the two connecting points 16 and 16' of the electrode, which connecting points are preferably arranged e.g. on a common connection lug. It will be noted that narrow base portions of the T-shaped projections of this embodiment may easily be deformed so that this capacitive transmitter electrode can advantageously adapt to a three-dimensional supporting surface (such as a vehicle floor).

The invention claimed is:

1. An automotive safety system comprising a transmitter electrode, said transmitter electrode comprising a conductive sheet material, said conductive sheet material comprising a first connecting point for connecting the electrode to an electronic sensing unit and at least one second connecting point for connecting the electrode to said electronic sensing unit, said second connecting point being arranged at a certain distance from said first connecting point so that said conductive sheet material forms a conductive path between said first and second connecting point.

2. The automotive safety system as claimed in claim 1, wherein said at least one second connecting point is arranged on said conductive sheet material at a location, which is diametrically opposed to the first connecting point from an electrical point of view.

3. The automotive safety system as claimed in claim 1, wherein said conductive sheet material comprises at least one incision, said at least one incision extending between said first and second connecting point from a border of said sheet material towards the interior of said sheet material.

4. The automotive safety system as claimed in claim 1, wherein said conductive sheet material comprises a plurality of incisions, each said incision extending from a border of said sheet material towards the interior of said sheet material, said incisions being arranged in such a way that said conductive path between said first and second connecting point comprises a meandering shape.

5. The automotive safety system as claimed in claim 1, comprising at least one diode means, said diode means being arranged at the second connecting point so as to be connectable in series between the electronic sensing unit and said second connecting point.

6. The automotive safety system as claimed in claim 1, wherein said conductive sheet material comprises at least one cut-out, said cut-out being arranged within a sensing area of said transmitter electrode.

7. The automotive safety system as claimed in claim 6, wherein said at least one cut-out overlaps with at least one incision of said conductive sheet material.

* * * * *